United States Patent Office 2,956,074
Patented Oct. 11, 1960

2,956,074
THIOPHOSPHORIC ACID ESTERS

August Dorken, Wuppertal-Sonnborn, and Gerhard Schrader, Wuppertal-Cronenberg, Germany, assignors to Farbenfabriken Bayer Aktiengesellschaft, Leverkusen, Germany, a corporation of Germany No Drawing. Filed Nov. 13, 1957, Ser. No. 696,034

Claims priority, application Germany Dec. 10, 1956

4 Claims. (Cl. 260—461)

The present invention relates to new thiophosphoric acid esters. Generally these esters may be represented by the following formula

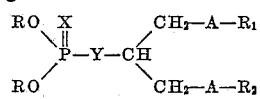

in which R stands for a lower alkyl radical, especially such ones having 1 to 4 carbon atoms, $R_1$ and $R_2$ stand for similar or different alkyl or aryl radicals, which also may be substituted, X and Y stand for oxygen or sulfur, at least one of them being sulfur, and A stands for the sulfoxide (SO-group) or sulfone group ($SO_2$-group).

Thiophosphoric acid esters with one alkyl or aryl mercapto alkyl-ester radical have become known as valuable insecticides recently. One representative of this group is known as demetone and has become of special importance in the field of systemic insecticides.

It is an object of the present invention to provide a class of very effective phosphoric acid esters. Another object is to find such phosphoric acid esters with special systemic activities. A further object is the preparation of these esters. Still further objects will become apparent as the following description proceeds. In accordance with the present invention it has been found that compounds of the above mentioned type are very valuable plant-protecting agents with a specially insecticidal activity. Those compounds may be prepared by methods, which are generally known. Thus for instance suitable substituted 1.3-sulfoxylo- or sulfono-propane-2-oles are reacted with O.O-dialkyl thionophosphoric acid halides in the presence of an acid binding agent. This reaction may be shown by the following equation, using 1.3-diethyl sulfoxydo propane-2-ole and O.O-diethyl thionophosphoric acid chloride:

(A)

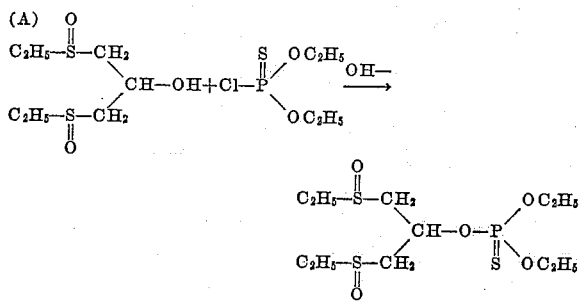

The corresponding sulfone may be reacted in the same way. Another method of preparing the inventive compounds consists in reacting corresponding 2-halo-propanes with salts of dialkyl thiol or thionothiol phosphoric acids as it might be shown by the following equation, using 1.3-diethyl sulfoxyde-2-chloro-propane and the ammonium salt of diethyl thiolphosphoric acid ester as reactants:

(B)

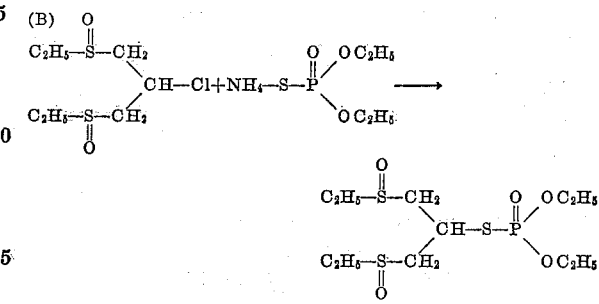

By the same way there may be reacted the corresponding sulfone on one hand and the corresponding dithiophosphoric acid salt on the other hand.

Still another way to obtain the inventive compounds consists in oxidizing corresponding 1.3-mercapto-propane-2-esters already formed by reactions as shown above, but using instead of the sulfoxides or sulfones the corresponding sulfides. This may be shown by the following equation:

(C)

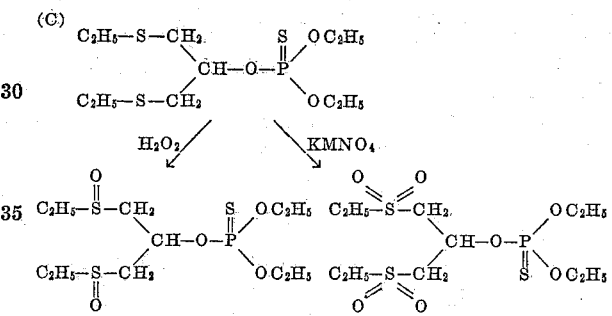

It has to be understood that all the above shown reaction schemes are given by way of illustration only, without limiting the present invention thereto. The reaction according to (A) should be carried out preferably in the presence of inert organic solvents and using suitable acid-binding agents. Inert solvents are for instance alcohols, ether, benzene, toluene, acetone, methyl ethyl ketone, and the like. It is also possible to use pyridine or the like as solvent and acid-binding agent. In the way according to reaction scheme (B) it is also advisable to use inert solvents such as alcohol, acetone, methyl ethyl ketone, and the like. Instead of the above shown ammonium salt also the sodium or potassium salt may be used with same success. Both reactions according to (A) or (B) should be carried out at slightly elevated temperatures say up to about 70 to 80° C. Usually temperatures between 40 and 60° C. give best results.

If the inventive compound should be obtained according to scheme (C) sulfoxides are obtained when oxidizing the sulfides with hydrogen peroxide at room temperature or somewhat lower temperature say down to about 0° C. Suitable inert solvents for this reaction are lower aliphatic carbonic acids especially glacial acetic acid. The hydrogen peroxide used should have a concentration of about 30°. If sulfones should be obtained the oxidation may be carried out economically with potassium permanganate in an acid solution. Aqueous emulsions containing diluted sulfuric acid may be used advantageously.

The new compounds of the present invention very effectively kill insects like flies, mites, aphids, etc. Most surprisingly they are of remarkable low toxicity against mammals. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned, water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers, etc.

As a special example for the utility of the inventive compounds the ester of the following formula

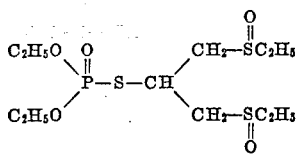

has been tested against spider mites (*Tetranychus altaeae,* V. Hanst=two-spotted spider) on *Phaseolus vulgaris.* 0.001% aqueous solutions kill effectively this kind of pests. These solutions are prepared as follows: same amounts of active ingredient and acetone are mixed and 20% its weight of commercial emulsifier, e.g. a benzyl hydroxy diphenyl polyglycol ether (referred to active ingredient), are added. This solution is diluted with water to the above shown concentration. The following examples illustrate the possibilities how to prepare the incentive compound without, however, restricting the present invention thereto.

*Preparation 1*

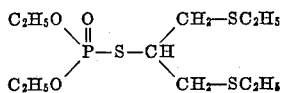

60 grams of 1.3-diethyl mercapto-2-chloropropane (B.P. 85° C./2 mm. Hg) are added dropwise at 40° C. to a solution of 62 grams of the ammonium salt of diethyl-thiol-phosphoric acid in 250 ml. of anhydrous alcohol and the reaction product is heated with stirring to 65° C. for a further 18 hours. It is then cooled to room temperature and from the ammonium chloride thus formed is filtered off. To the filtered solution 100 ml. of benzene are added and the benzene layer is washed three times with 100-ml.-portions of water. The benzene solution is then dried over sodium sulfate. After distillation of the solvent, 96 grams of the new ester are obtained as a water-soluble non-distillable yellow oil. Yield: 95% of the theoretical.

*Preparation 2*

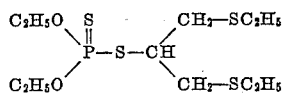

31 grams of 1.3-diethyl mercapto-2-chloropropane are added dropwise with stirring to an aqueous solution obtainable by neutralizing 29 grams of diethyl-dithiophosphoric acid with a 10% sodium carbonate solution. The mixture is heated to 65° C. for 5 hours, the reaction product is then diluted with 200 ml. of benzene and thoroughly shaken. The benzene layer is separated, washed twice with 100-ml.-portions of water and dried over sodium sulfate. After distillation of the solvent, 48.2 grams of the new ester are obtained as a yellow water-insoluble oil. Yield: 92% of the theoretical.

*Preparation 3*

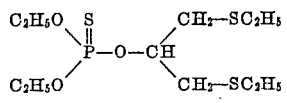

37.5 grams of 1.3-bis-diethyl mercapto - 2 - propanol (B.P. 95–96° C. 2 mm. Hg) are dissolved in 120 ml. of toluene. 34 grams of dry and powdered potassium carbonate are added thereto. 1 gram of copper powder is added to speed up the reaction. 39 grams of diethyl-thionophosphoric acid monochloride are added dropwise with stirring to this suspension at 60° C. within 10 minutes and the reaction product is heated to 75–80° C. for a further 7 hours. It is then cooled to room temperature, the salts thus formed are filtered off with suction, and the separated organic layer is shaken with a diluted aqueous sodium carbonate solution. After drying over sodium sulfate, the solvent is removed by distillation. 35 grams of the new ester are thus obtained as a brown water-insoluble oil.

*Preparation 4*

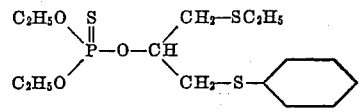

46 grams of 1-ethyl mercapto-3-phenyl mercapto-2-propanol (B.P. 103° C./0.01 mm. Hg) are mixed with 38 grams of diethylthionophosphoric acid chloride. 17 grams of anhydrous pyridine are added dropwise with stirring at 40° C. The mixture is then heated to 65° C. for a further 2½ hours. After cooling, it is diluted with 115 ml. of water to which 15 ml. of concentrated hydrochloric acid are added, 150 ml. of chloroform are then added and the mixture is shaken out. The chloroform layer is separated and washed again with 100 ml. of water and then dried over sodium sulfate. After clarifying the solution over active carbon, the solvent is removed by distillation. 61 grams of the new ester are thus obtained as a brown sparingly water-soluble oil (80% of the theoretical).

*Preparation 5*

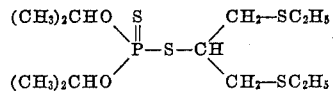

36 grams of the ammonium salt of diisopropyldithiophosphoric acid are dissolved in 150 ml. of methyl ethyl ketone. 31 grams of 1.3-diethyl mercapto-2-chloropropane are added thereto with stirring at 40° C. and the reaction product is heated to 65° C. for 6 hours. It is then cooled to room temperature and the ammonium chloride thus formed is filtered off with suction. After working up as usual, 48.3 grams of the new ester are obtained as a water-insoluble yellow oil.

*Preparation 6*

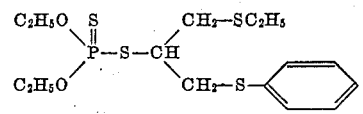

32 grams of diethyl dithiophosphoric acid are dissolved in the stoichiometrically requisite amount of sodium ethylate solution. 42 grams of 1-ethyl mercapto-3-phenyl-mercapto-2-chloropropane (B.P. 99° C./0.01 mm. Hg) are added dropwise to this solution with stirring at 40° C. The reaction product is heated to 65° C. for 5 hours, then worked up in usual manner. 57.5 grams of the new ester are thus obtained as a dark yellow water-insoluble oil. Yield: 87% of the theoretical.

*Preparation 7*

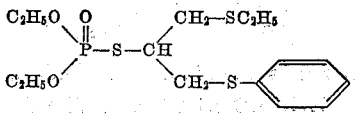

38 grams of the ammonium salt of diethyl-thiolphosphoric acid are dissolved in 140 ml. of absolute alcohol. At 40° C., 50 grams of 1-ethyl mercapto-3-phenyl mercapto-2-chloropropane are added dropwise with stirring, and the reaction product is heated to 65° C. for 22 hours. After working up as usual, 67 grams of the new ester are obtained as a yellow water-insoluble oil.

*Example 1.*—The phosphoric acid ester obtained according to Preparation 1 is oxidized with hydrogen peroxide to form the corresponding sulfoxide of the following formula

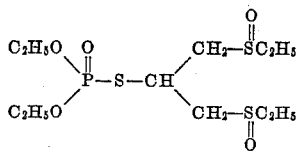

as follows: 58 grams of the thiolphosphoric acid ester obtained according to Preparation 1 are dissolved in 100 ml. of methanol. To this solution there is added 1 ml. of 50% aqueous sulfuric acid. While stirring and cooling there are dropped into this solution within a period of 20 minutes 36 grams of a 35% aqueous hydrogen peroxide solution. This mixture is stirred for 2½ further hours at 40° C., whereafter the reaction mixture is allowed to cool down. 3 grams of calcium carbonate are added while stirring. The salts and small impurities which have been formed during the reaction are removed by filtration. There are added 300 ml. of benzene and the mixture is distilled, until the water has disappeared. There are obtained 60 grams of the sulfoxide ester of the above shown formula as a water-unsoluble thick oil. Yield: 90% of the theoretical. 0.1% solutions are 100% systemic-ally active against black bean aphids. This sulfoxide is completely effective against spider mites even at a concentration of 0.001%.

*Example 2.*—The sulfide obtained according to Preparation 1 is oxidized with potassium permanganate to form the corresponding sulfone of the following formula

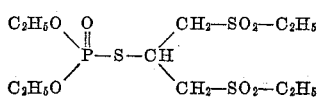

as follows: 35.7 grams of the phosphoric acid ester obtained according to Preparation 1 are added dropwise to a solution of 60 grams of potassium permanganate and 33 grams of magnesium sulfate (crystallized) in 350 ml. of water. While adding the phosphoric acid ester the temperature has to be kept at about 6 to 10° C. This takes about 70 minutes. The mixture is allowed to react for further 2 hours at 15 to 20° C. while stirring. Now $SO_2$ is introduced in the reaction mixture, until it becomes colorless. The reaction mixture then is purified by filtration and sodium sulfate is added, until it does not dissolve any longer. The phosphoric acid ester of the above formula precipitates as an oil, which is taken up in 150 ml. of chloroform. The chloroformic layer is dried over unhydrous sodium sulfate and the solvent then is distilled off in vacuum. There are obtained 37 grams of the above shown sulfone, which kills spider mites completely in the form of a 0.01% aqueous solution. This sulfone shows a $LD_{50}$ of 5 mg./kg. on rats orally.

*Example 3.*—The phosphoric acid ester obtained according to Preparation 2 is oxidized with hydrogen peroxide to form the sulfoxide of the following constitution

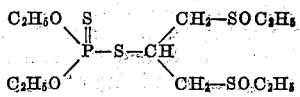

as follows: 63 grams of the phosphoric acid ester according to Preparation 2 are dissolved in 100 ml. of methanol. 1 ml. of a 50% sulfuric acid is added. Within 30 minutes there is added while stirring at about 30° C. a 35% aqueous solution of hydrogen peroxide (35 grams). After the reaction has been completed the mixture is stirred for 4 further hours at 40° C., whereupon the mixture is neutralized by 3.5 grams of calcium carbonate. The mixture is filtered and the solvent removed by distillation. There are obtained 68 grams of the new sulfoxide of the above shown formula as a yellowish slightly water-soluble oil. Yield: 99% of the theoretical. This compound is systemically active and shows a toxicity of 10 mg./kg. on rats orally.

By the same way there may be obtained the following sulfoxide and sulfone containing esters of the following formulae

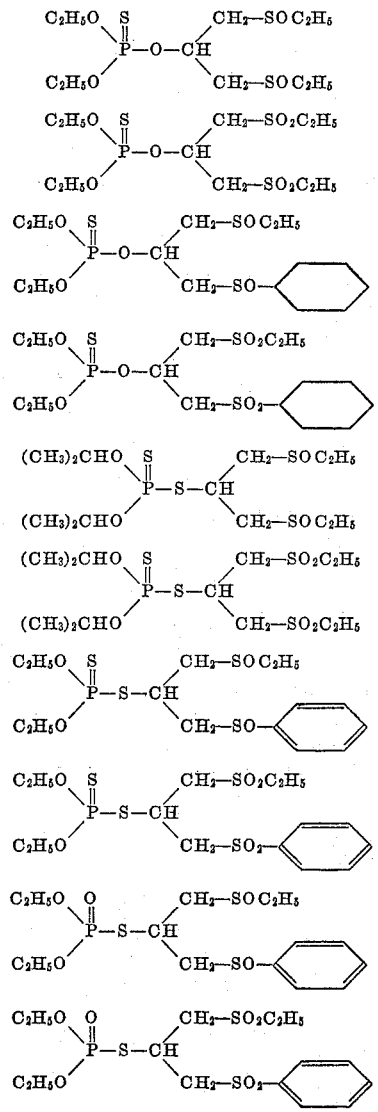

We claim:
1. Thiophosphoric acid esters of the following formula

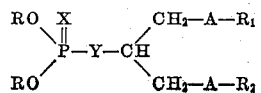

wherein R stands for lower alkyl radicals up to 4 carbon atoms, $R_1$ and $R_2$ stand for a member selected from the group consisting of lower alkyl and phenyl radicals, A stands for a member selected from the group consisting of SO and $SO_2$, and X and Y stand for a member selected from the group consisting of oxygen and sulfur, one of them being sulfur.

2. The thiophosphoric acid ester of the following formula

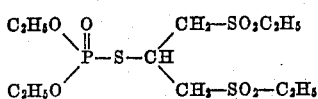

3. The thiophosphoric acid ester of the following formula

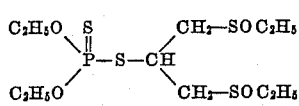

4. The thiophosphoric acid ester of the following formula

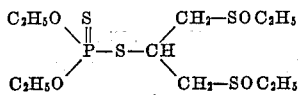

References Cited in the file of this patent

UNITED STATES PATENTS 2,791,599   Lane   May 7, 1957

FOREIGN PATENTS 1,113,363   France   Dec. 5, 1955
F. 16,085   Germany   Feb. 23, 1956
311,106   Switzerland   Jan. 31, 1956

OTHER REFERENCES

Fukuto et al.: J. of Econ. Entomology, vol. 48, No. 4, August 1955, p. 350.

Fukuto et al.: J. of Econ. Entomology, vol. 48, pp. 347–349, 351–354.

UNITED STATES PATENT OFFICE
CERTIFICATION OF CORRECTION

Patent No. 2,956,074

October 11, 1960

August Dorken et al.

It is hereby certified that error appears in the above numbered patent requiring correction and that the said Letters Patent should read as corrected below.

Column 3, line 38, for "incentive" read -- inventive --; column 4, lines 29 and 30, and column 6, lines 35 and 36, and lines 40 and 41, the lower right-hand portion of the formulas, the benzene ring, each occurrence, should appear as shown below instead of as in the patent:

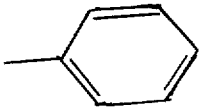

column 8, lines 3 to 5, the formula should appear as shown below instead of as in the patent:

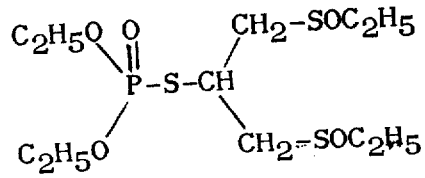

Signed and sealed this 19th day of September 1961.

(SEAL)
Attest:

ERNEST W. SWIDER

Attesting Officer

DAVID L. LADD

Commissioner of Patents